(12) United States Patent
Shen

(10) Patent No.: US 11,231,850 B1
(45) Date of Patent: Jan. 25, 2022

(54) HYBRID DIGITAL AND PHYSICAL WRITING SURFACE WITH TRANSFORMATIONAL INK EFFECTS

(71) Applicant: Ji Shen, San Diego, CA (US)

(72) Inventor: Ji Shen, San Diego, CA (US)

( * ) Notice: Subject to any disclaimer, the term of this patent is extended or adjusted under 35 U.S.C. 154(b) by 0 days.

(21) Appl. No.: 17/192,874

(22) Filed: Mar. 4, 2021

(51) Int. Cl.
*G06F 3/0488* (2013.01)
*G06F 3/0354* (2013.01)
*G06F 3/044* (2006.01)
*G06F 3/045* (2006.01)

(52) U.S. Cl.
CPC ...... *G06F 3/04883* (2013.01); *G06F 3/03545* (2013.01); *G06F 3/044* (2013.01); *G06F 3/045* (2013.01)

(58) Field of Classification Search
CPC .. G06F 3/04883; G06F 3/03545; G06F 3/044; G06F 3/045
See application file for complete search history.

(56) References Cited

U.S. PATENT DOCUMENTS

| 9,024,901 B2 | 5/2015 | Miyazaki |
| D755,785 S | 5/2016 | Sirotich |
| 9,519,414 B2 | 12/2016 | Farouki |
| 10,782,844 B2 | 9/2020 | Farouki |

FOREIGN PATENT DOCUMENTS

CN 105955555 A * 9/2016

* cited by examiner

*Primary Examiner* — Michael Pervan
(74) *Attorney, Agent, or Firm* — Insigne PC

(57) ABSTRACT

The present invention provides a new and useful hybrid digital and physical interactive writing surface. A user writes on a physical writing surface using thermal ink. Underneath the physical writing surface is a heating layer. Once the heating layer is activated, the thermal ink disappears. Meanwhile, sensors capture a user's strokes while writing, and a computing device digitally stores the captured strokes. Therefore, there is zero-time delay or lag time between writing on the physical writing surface and its appearance. Finally, there is no need to erase any writing nor use other sheets or boards after one use because the writing is automatically erased.

20 Claims, 5 Drawing Sheets

HYBRID DIGITAL AND PHYSICAL WRITING SURFACE WITH TRANSFORMATIONAL INK EFFECTS

BACKGROUND OF THE INVENTION

1. Field of Invention

The present invention relates to interactive digital writing systems.

2. Description of Related Art

An interactive whiteboard, also known as an interactive board or smartboard, is a large interactive display in the form factor of a whiteboard. It can either be a standalone touchscreen computer used independently to perform tasks and operations or a connectable apparatus utilized as a touchpad to control computers from a projector. Interactive whiteboards are used in various settings, including classrooms at all levels of education, corporate board rooms and workgroups, training rooms for professional sports coaching, and broadcasting studios. In academic settings, the interactive whiteboard fosters better educational engagement and participation between teachers and students.

In educational and classroom settings, interactive whiteboards have replaced traditional whiteboards or flipcharts or video/media systems such as DVD players and television combinations. Even where traditional whiteboards are used, the interactive whiteboard often supplements the traditional boards by connecting to a school network digital video distribution system. Other interactive whiteboards cooperate with online shared annotations and drawing environments such as interactive vector-based graphical websites.

Traditional interactive whiteboards acting as standalone touchscreen computers have a large LCD or LED display panel, a glass touch screen, and a built-in computer. The integrated computer enables a user to control an interactive whiteboard system directly from the touch screen. A user can run software that is loaded onto the computer, capture and save notes, and use optical character recognition ("OCR") software to translate handwriting from the touch screen into text.

Meanwhile, interactive whiteboards used as a touchpad and coupled to a computer usually require a device driver. The device driver is installed on the attached computer. The interactive whiteboard acts as a Human Input Device ("HID"). The computer's video output is connected to a digital projector to project images on the whiteboard's surface. A user must calibrate the whiteboard image by matching the projected image's position in reference to the whiteboard using a pointer or other device. The user activates programs, buttons, and menus from the physical whiteboard like one would do using a mouse on a computer. If text input is desired, a user invokes an on-screen keyboard or, using whiteboard software, handwriting recognition.

Most boards use infrared scan technology, a resistive, touch-based board, an electromagnetic pen, and software, or an ultrasonic pen to create the interaction between a user and the content projected on the whiteboard. Interactive whiteboards using infrared scan technology are large interactive displays that connect to a computer and projector. The board is typically mounted to a wall or placed on a floor stand. A user moves their finger, pen, marker, stylus, or other pointer device over the projected image on the whiteboard's surface. The movement is captured by the interference with infrared light at the surface of the whiteboard. When the whiteboard surface is pressed, software triangulates the location of the marker or stylus. Infrared interactive whiteboards generally do not use any dry-erase markers nor ink pens because the writing is entirely digital.

A resistive touch-based interactive whiteboard involves any pointing device. The most common resistive system uses a membrane stretched over the whiteboard's surface. The membrane deforms under pressure to make contact with a conducting backplate. The touchpoint location is determined electronically and gets registered as a mouse or input event. For example, when a user presses their finger on the whiteboard's surface, the press is registered as the equivalent of a left mouse click.

For electromagnetic pen-based interactive whiteboards, an array of wires are embedded behind a solid whiteboard surface. The wire array and surface interact with a coil in the stylus's tip to determine the stylus's horizontal and vertical coordinates. The stylus or pen usually contains no batteries or other power sources. The stylus alters the electrical signals produced by the board. When the stylus is close to the board's surface, the mouse pointer is sensed, giving the board mouse-over capabilities. When the stylus is pressed against the board, the board activates a switch in the pen to signal a mouse click on the computer. However, if the stylus is pressed in another way, contact with the board signals a click on the right mouse button.

Finally, ultrasonic IR pen-based interactive whiteboards use infrared light and ultrasound positioning technology. Ultrasound positioning technology computes the time difference between the speed of light and the speed of sound. The whiteboard system requires a connection to a computer. The projected image is recalibrated using an electronic pen. A device or bar scans a bracketed area. Multiple brackets can be added, providing users at various locations to share the same virtual whiteboard. IR pen-based whiteboards can be portable because no battery is required for the USB signal receiver to work. The portable systems work on various surfaces, including a flat wall, a chalkboard, or other writing surfaces.

Most interactive digital writing systems require a special writing stylus. These stylists are made with plastic tips to achieve resistive or conductivity touch sensitivity needed to write on a board. Because a stylist must be used, interactive whiteboard displays require a glass top writing surface, which creates a thick layer between the display and writing surface. The stylus with the plastic tip must move over or touch this thick glass layer. The thick glass layer distorts the tactual feedback. Thus, the writing experience is not as natural compared to writing with an ink pen.

The software supplied with some interactive whiteboards allows teachers or presenters to keep notes and annotations as electronic files to distribute later. This distribution can be on paper or through several electronic formats. Additionally, some interactive whiteboards allow teachers to record their lectures as digital video files and post the material for review by students at any time. Some whiteboards provide response systems as an integrated part of the interactive whiteboard product to further classroom engagement. Handheld clickers operate via infrared or radio signals and offer multiple choice and polling questions to users. Tablets are also provided; however, a user must learn how to write on a tablet, which provides no tactual feedback when writing. Additionally, there always exists a substantial delay in the appearance of the writing from the tablet to the interactive whiteboard display screen.

Teachers or lecturers must go beyond planning or writing lectures out before presenting. Teachers are required to install, configure, and maneuver the necessary software programs to give lectures. Furthermore, interactive whiteboards are complicated to use and take large quantities of time to learn how to use them. Learning how to use causes interruptions in the classroom environment. Many teachers lack the adequate technology training to efficiently use the interactive whiteboards and instead display their handwritten notes on a non-interactive whiteboard. However, just showing handwritten notes completely defeats the interactive whiteboard's classroom interactivity and student engagement goals.

Moreover, some interactive whiteboards must be erased after every use. Erasing takes time, and if the teacher wants to make the writing digital, they first have to perform a storing step, then erase the words. However, if the teacher forgets to store the writing and erases it first, they lose it forever. Additionally, if using paper or handwritten notes projected on a screen, the lecturer must remove the paper, replace the handwritten notes with a new sheet, or erase them repeatedly after writing. Thus, a need exists for a whiteboard that automatically erases and stores handwriting in a digital format.

No interactive whiteboards use a pen or marker with real ink to mimic a natural handwriting feel. Because all interactive digital writing systems use digital pens or markers, there always exists a lag or time delay between pressing on a board, writing, and the writing appearing on the board. Writing with an ink pen, inked stylus, ballpoint pen, marker, dry erase marker, or any other ink-based writing instrument offers the most natural and classic tactual feedback experience. When writing with an ink pen or inked stylus, the ink immediately flows out of the pen or stylus tip, creating zero time delay between the tactual writing action and the ink's appearance on the writing surface. This immediate, natural, and gratifying writing experience has currently been impossible to achieve digitally. Because using ink is a physical and chemical process, it is not readily digitized for this century's digital writing advancements. Educators used to resort to scanning their writing surface and then printing the scanned image. Sometimes, teachers and other presenters write on a whiteboard using an ink-based marker and then take a picture of the entire board with completed writing to disseminate to others. Using this picture-taking process, the user then has to go through OCR or other recognition processes to digitize the image. This picture-taking, scanning, and recognizing process is inconvenient, time-consuming, and mostly inaccurate.

For a user to digitize and capture writing, there always exists a time delay because of a long chain of events. First, the system must digitally capture a user's stroke from their writing action using sensors. Second, the sensor's captured data must be transmitted via certain digital links to a computer for processing. Third, in turn, the computer calculates the virtual and digital trajectory of the stroke motion, often referred to as vectors. The vectors are relative to the virtual surface area in the uploaded software that matches the physical writing surface. Fourth, the computer must assign the vector values. Fifth, the computer sends the vector values and color information to a projector or flat panel display. Sixth, once at the display, the written words will appear after a user has already started to write on the desired surface.

One of ordinary skill in the art appreciates this long chain of electronic and digital calculation events to produce a digital writing experience. During this process, there is a processing delay at every step. These time delays can range from 100 milliseconds to 500 milliseconds, or sometimes even longer. Because of the time delay, the digital words always appear behind the writing stylus's tip. This inherent delay is time-consuming and very expensive to minimize. Even when the software and hardware are at the highest performance level, the wait is still present. At the highest optimal hardware and software level, certain implementations could reduce visible delay, but any reduction is not easily discernable to the naked human eye. Thus, a need exists for an efficient way to digitize writing without a time delay.

In light of these challenges in the field, there is a need for a hybrid digital and physical writing surface using real ink with zero time delay that erases any writing.

SUMMARY OF THE INVENTION

The present invention overcomes these and other deficiencies of the prior art by providing a digital and physical interactive writing surface that uses physical ink. The interactive writing surface does not require special styluses. Instead, an ink pen with thermal ink is used, eliminating the need to erase and producing no time delay when writing on the surface. A heating layer is utilized underneath a physical writing surface. The heating layer is configured to heat directly underneath a user's writing and strokes at the writing surface layer. After a user writes, the ink fades away and visually disappears. The writing surface is operably connected to a computer that digitally stores the writing.

In an embodiment of the invention, an interactive writing device comprises a writing surface; a touch-sensitive layer or touch-sensitive frame; and a heating layer, wherein the heating layer heats the writing surface. The interactive writing device further comprises a writing stylus. The writing stylus comprises thermal ink. The interactive writing device may further comprise a computer device. The interactive writing device may further comprise a projector. The touch-sensitive layer comprises a resistive touch sensor system or a projected capacitive sensor system. The heating layer comprises a matrix of heating pads. The touch-sensitive frame comprises an infrared touch-sensitive frame. The interactive writing device may further comprise a flat panel display screen.

In another embodiment of the invention, a writing system comprises: a writing surface, wherein the writing surface is configured to receive handwriting; a touch-sensitive layer or touch-sensitive frame, wherein the touch-sensitive layer or touch-sensitive frame captures the handwriting; thermal ink deposited on the writing surface via the handwriting; and a heating layer, wherein the heating layer heats the writing surface causing the thermal ink to visibly disappear. The writing system may further comprise a computer device. The captured handwriting is stored digitally and manipulated. The writing system may further comprise a writing stylus for depositing the thermal ink.

In yet another embodiment of the invention, a method for digitizing ink-based writing comprises the steps of depositing handwriting on a writing surface; digitizing the handwriting; heating the deposited handwriting; and visually disappearing the deposited handwriting. The method may further comprise the steps of storing the digitized handwriting and transmitting the stored digitized handwriting. The method may further comprise the step of depositing additional handwriting over the visually disappeared handwriting.

The interactive writing surface provides an interactive digital and physical writing system that advantageously accommodates multiple learning styles. The system's interactivity caters to audio, visual, and kinetic learners because users can watch, listen, participate, and feel what is on the board. Additionally, the information on the board is easily modified to be accessible for both students and teachers. For example, increasing the text size or changing text color. These modifications are significant to aid people with visual disabilities in the classroom.

Another benefit of the interactive system is that it encourages student engagement. Student engagement and interactivity, and student performance are positively linked in a classroom environment. The digital interactive system supports any ink pen that allows students to write, draw, and edit directly on the writing surface. Thus, it is simple for students and teachers to interact immediately during a lecture. This interactivity fosters real-time collaboration and idea-sharing in a digital environment within or out of a classroom.

Additionally, the interactive system easily allows teachers to digitize lessons. Materials can be uploaded to cloud storage, where the interactive lessons are always accessible to students. A more centralized and streamlined learning environment is created where students can rapidly ask questions and access the answers they need in real-time.

Another advantage is that the interactive writing surface allows a user to write using thermal ink with the feel and appearance, at least for a time, of actual ink. Avoiding digital ink eliminates the lag time or time delay between writing and the writing appearing on the board. Furthermore, the heating layer eliminates the need to erase any writing. Therefore, a user can use the board without getting a new sheet or filling up a clustered board. A user now can write using the most natural and efficient writing method possible—writing with pen and ink, all while never erasing.

The foregoing and other features and advantages of the present invention will be apparent from the following, a more detailed description of the present invention's preferred embodiments and the accompanying drawings.

BRIEF DESCRIPTION OF THE DRAWINGS

For a complete understanding of the present invention, the objects, and advantages thereof, reference is now made to the ensuing descriptions taken in connection with the accompanying drawings briefly described as follows.

Throughout the drawings, identical reference characters and descriptions indicate similar, but not necessarily identical, elements.

DETAILED DESCRIPTION OF PREFERRED EMBODIMENTS

Preferred embodiments of the present invention and their advantages may be understood by referring to FIGS. 1-5. The described features, structures, or characteristics of the invention may be combined in any suitable manner in one or more embodiments. It will be apparent to those skilled in the art that various modifications and variations can be made to the present invention without departing from the invention's spirit and scope. Thus, it is intended that the current invention cover modifications and variations consistent with the scope of the appended claims and their equivalents. The term writing or handwriting as used herein refers to any writing type and includes anything a user could draw or mark using a pen on a writing surface.

Figure 1:
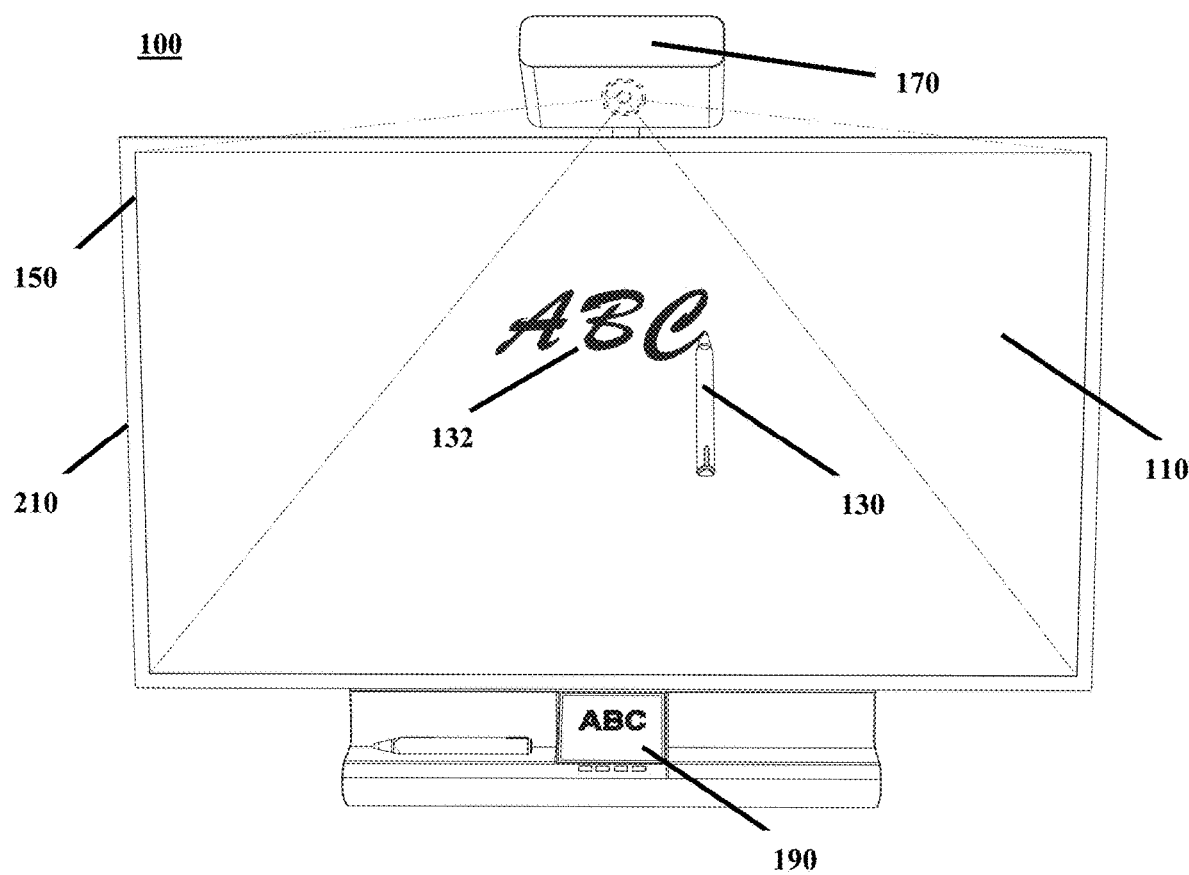
FIG. 1 illustrates a front-facing view of an interactive writing surface according to an embodiment of the invention.

FIG. 1 is a front-facing view of a hybrid digital and physical interactive writing surface 100 according to an embodiment of the invention. In this embodiment, a physical writing surface 110 is shown, which is a whiteboard or whiteboard style, transparent glass, paper, or other commonly used surfaces to write on. A writing stylus 130 with physical or liquid ink is used to write on the physical writing surface 110. The writing stylus 130 is any stylus, pen, marker, or writing device that uses ink. More specifically, the writing stylus 130 uses thermal ink 132.

Additionally, the writing stylus 130 can be electronic to signal the proper ink color to a connected computer device 190. Underneath the physical writing surface 110 exists a touch-sensitive layer 150. The touch-sensitive layer 150 is a thin layer or film that enables any touch screen technology, including but not limited to resistive touch or projected capacitive sensing technologies, the identification and implementation of which are apparent to one of ordinary skill in the art. A heating layer 210 is affixed underneath the touch-sensitive layer 150. The heating layer 210, once enabled, erases the thermal ink 232 from the physical writing surface 110. A computer device 190 is connected to the interactive writing surface 100. The computer device 190 is connected either in a wired manner or wirelessly through Bluetooth, WIFI, or other wireless connectivity technologies.

Furthermore, the computer device 190 is any computing device including, but not limited to, a desktop computer, laptop, mobile smartphone, or other computing device, the identification of which is apparent to one of ordinary skill in the art. The computer device 190 can be coupled to, housed within, or integrated mechanically to the interactive writing surface 100. The computer device 190 controls and enables the touch-sensitive layer 150 and heating layer 210. The computer device 190 also uses various software, such as but not limited to interactive whiteboard software. A projector 170 is connected to the computer device 190 and the interactive writing surface 100. The projector 170 is connected either through wires or wirelessly, using any aforementioned wireless connectivity technologies. The projector 170 displays an image from the computer device 190 directly onto the physical writing surface 110. The projector 170 is any commonly used projectors such as LCD, DLP, or laser-type projectors.

The interactive writing surface 100 digitally stores the writing on the physical writing surface 110 and thus is a security measure. Each written stroke is recorded digitally. In the case of power outages or user errors where words are erased or deleted, the interactive writing surface saves the written words immediately before emergencies or mistakes occur.

Figure 2:
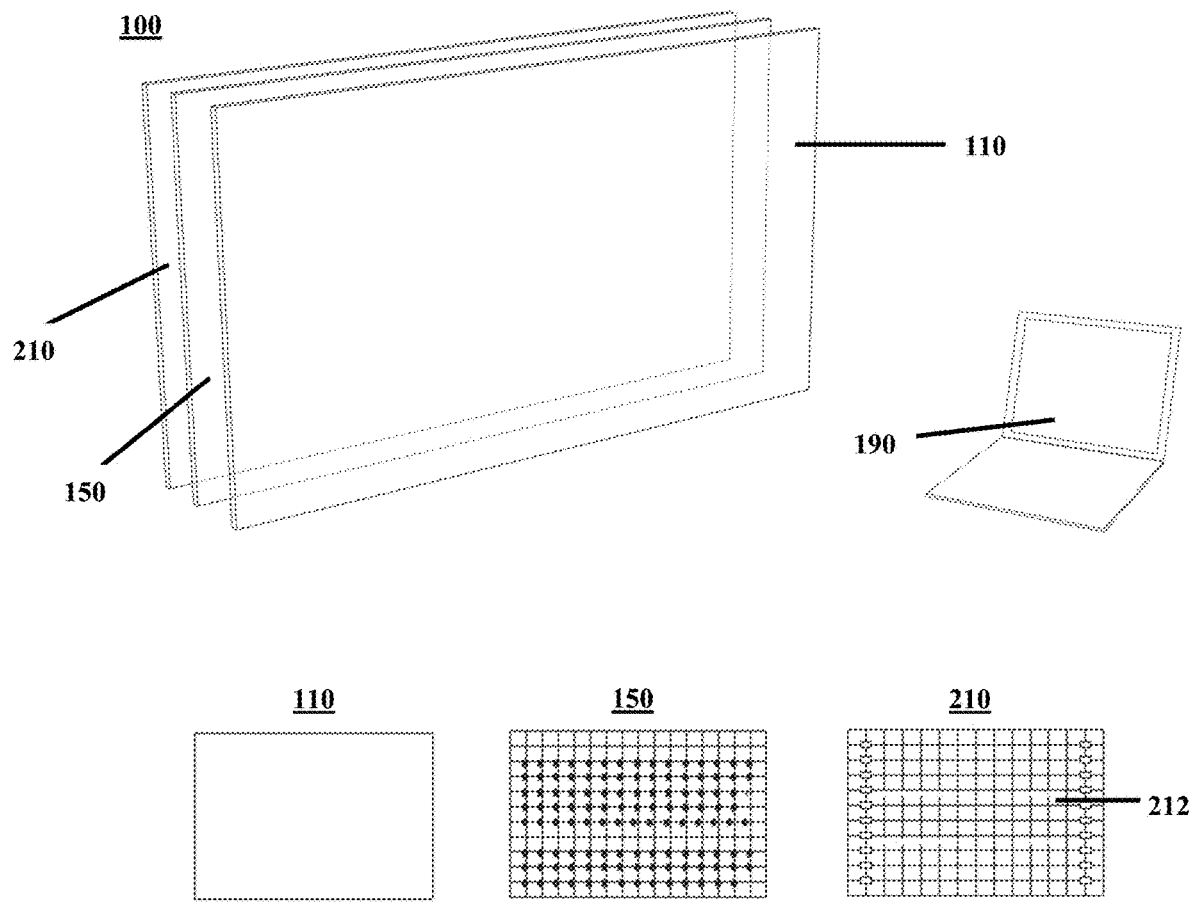
FIG. 2 illustrates a disassembled view of an interactive writing surface.

FIG. 2 depicts a disassembled view of the interactive writing surface 100. A multiple-layer interactive writing surface 100 is shown. The first layer is a physical writing surface 110. Underneath the first layer 110, is a second layer, a touch-sensitive layer 150. Underneath the second layer 150 exists a third layer, a heating layer 210. The heating layer 210 forms a matrix of thin heating pads 212 underneath the touch-sensitive layer 150. The heating layer 210 preferably is constructed from thin heating pads 212 but can be any type of thin layer used to produce heat. Once the heating layer 210 is activated, the thermal ink 132 begins to disappear, targeting underneath where the user's strokes are captured on the physical writing surface 110. Because the thermal ink 132 disappears, there is no need to erase any writing or use more than one sheet, board, or another writing surface. Therefore, the physical writing surface 110 is used repeatedly until the lecture or presentation is completely over without causing any interruptions to the learning process.

Figure 3:
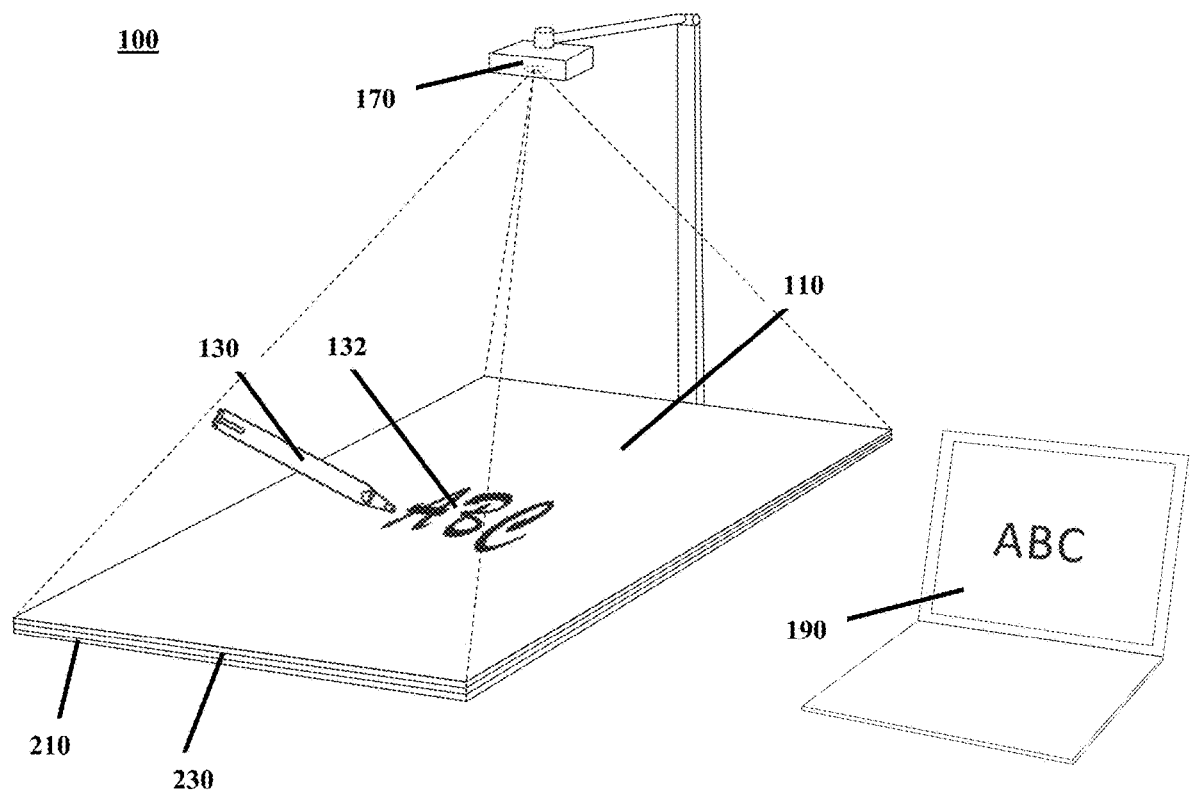
FIG. 3 illustrates an interactive writing surface pad according to another embodiment of the invention.

A different embodiment is shown in FIG. 3. In this embodiment, the interactive writing surface 100 forms a writing pad or tablet. Instead of a large whiteboard display, the present embodiment is advantageous for mobile or portable uses. A physical writing surface 110 is a pad, tablet, or other portable writing surface in this version. An infrared touch-sensitive frame 230 surrounds the physical writing surface 110 to capture a user's strokes or writing. A projector 170 is positioned above the physical writing surface 110 to display an image from a connected computer device 190. The physical writing surface 110 can be a sheet of paper on top of the touch-sensitive layer 150 and heating layer 210. Because the heating layer 210 erases the thermal ink 232, a user never has to replace the sheet when writing or after writing. In an embodiment of the invention, the touch-sensitive frame 230 utilizes infrared scan technology where the movement of the user's finger, pen, or other pointer is captured by its interference with infrared light at the surface of the whiteboard. Software triangulates the location, the implementation of which is apparent to one of ordinary skill in the art.

Figure 4:
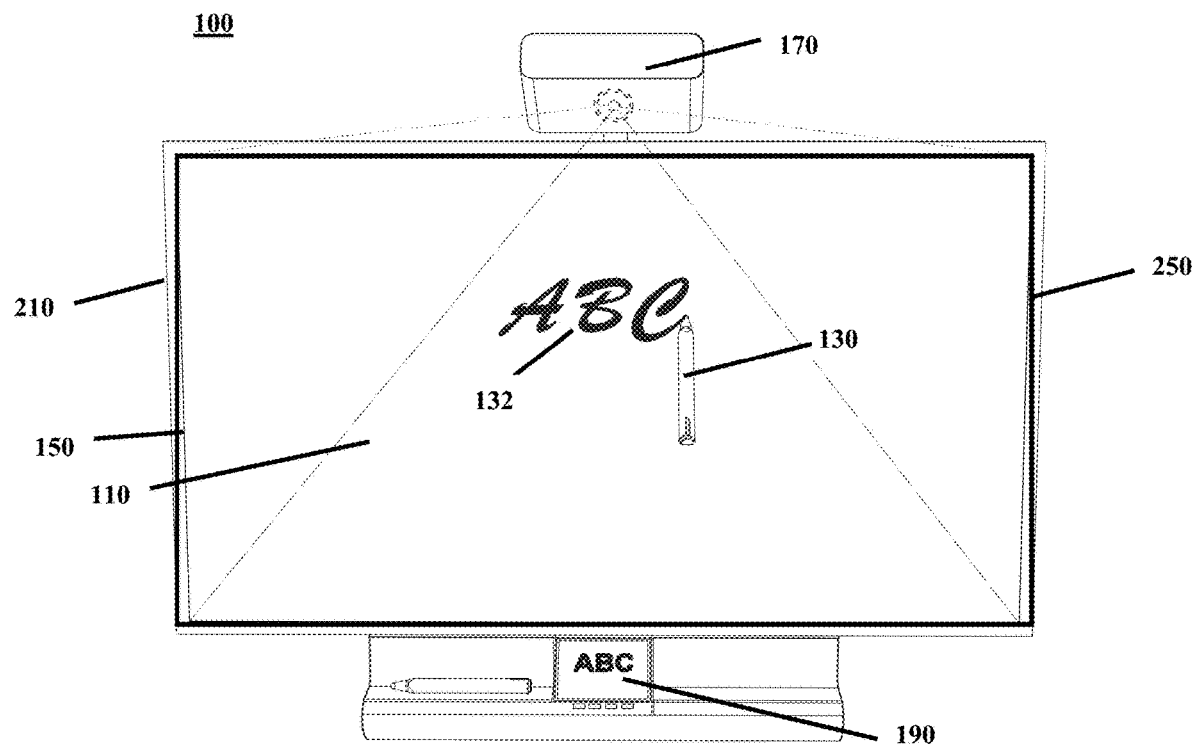
FIG. 4 is a front-facing view of an interactive writing surface with a front flat panel display screen.

FIG. 4 depicts another embodiment of the interactive writing surface 100. In this embodiment, another layer is added to the interactive writing surface 100. The first layer is a physical writing surface 110. Underneath the first layer 110 is a second layer, a flat panel display screen 250. Underneath the second layer 250, exists a third layer, a touch-sensitive layer 150. Behind the third layer 150, there is a fourth layer, a heating layer 210. The flat panel display 250 is any flat panel display or display screen. Because the flat panel display 250 is underneath the physical writing surface 110, all layers underneath the flat panel display 250 are transparent.

Furthermore, the touch-sensitive layer 150 is a matrix of touch sensors or other similar touch sensing devices. The touch-sensitive layer 150 provides a user, and in the classroom setting, a student, the interactivity required to promote an optimal learning environment further. Students are wholly engaged in a lecture because they can write on the physical writing surface 110, see the writing, manipulate the digitally stored writing, and even hear what is being written.

Figure 5:
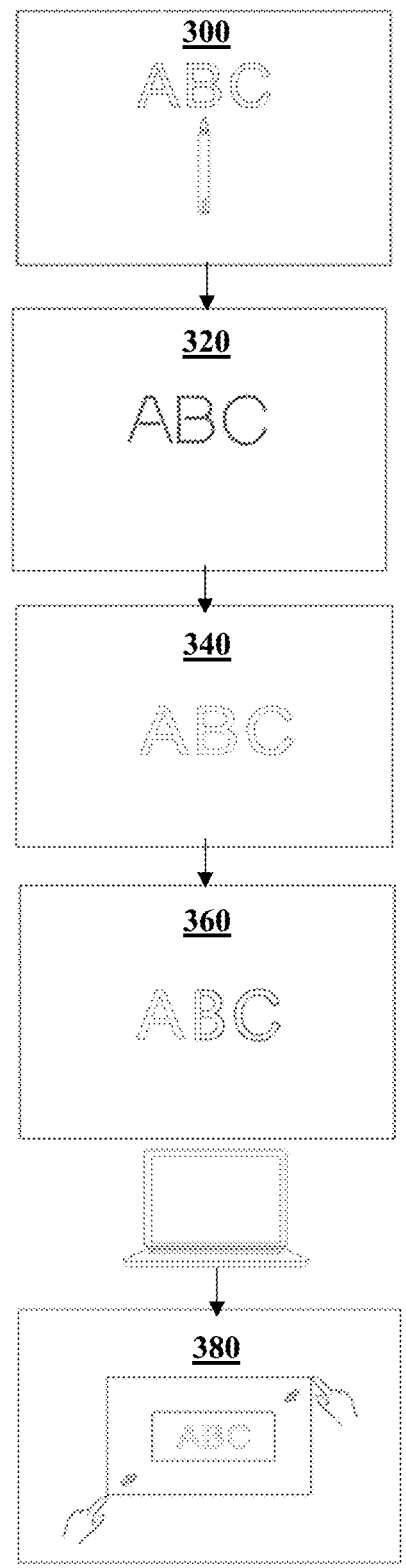
FIG. 5 is a flow chart showing writing, capturing, ink disappearing, and manipulating a digital interactive writing system.

As shown in FIG. 5, a user writes 300 on a physical writing surface 110, using a writing stylus 130 with thermal sensitive ink 132. The thermal sensitive ink 132 appears on the physical writing surface 110. Simultaneously, touch sensors capture 320 all of the user's writing strokes digitally into vectors. The vectors are transmitted to a connected computer device 190. The touch sensors are located at the touch-sensitive layer 150. Once the connected computer 190 receives the captured vectors, the computer 190 calculates what the user draws or writes. For example, if a user draws a triangle, the computer 190 calculates that the user draws a triangle. If words or characters are written, the computer 190 calculates that words or characters are being written. Underneath the physical writing surface 110, there is a heating layer 210. The computer 190 sends instructions 340 to the heating layer 210 to turn on. Heat is produced underneath the area of the vectors or writing area on the physical writing surface 110. The heating layer 210 provides heat to the exact surface area where the strokes or vectors are established. Thus, the thermal sensitive ink 132 begins to fade and disappear on the physical writing surface 110 immediately. As the thermal sensitive ink 132 is disappearing, the computer 190 simultaneously sends 360 the vectors' color values corresponding to the ink strokes to an attached projector 170 or display panel. Immediately, the digital version of the ink appears in place of the thermal ink 132. This entire process is instantaneous to mimic a natural tactile feel of writing or done with an animated effect, such as in presentations, to achieve more entertaining results.

After the ink strokes are digitally captured, a user manipulates 380, the digital version of the ink strokes. Some processing manipulations include, but are not limited to: selecting, moving, enlarging, shrinking, rotating, digitally saving, saving and retrieving, performing artificial intelligent based recognition for shape or character, augmenting reality, and making 2D or 3D digital objects or models appear on the writing surface or screen. For example, a user writes the word elephant on the physical writing surface 110. Once the word is recognized, an image of an elephant or a 3D elephant appears on the physical writing surface 110 from the display screen or projector 170. The manipulations 380 performed on the physical writing surface 110 achieve optimal interactivity and engagement between students and teachers.

The interactive writing surface 100 recreates the seamless and immediate feedback of writing with a pen and ink on a suitable surface. Because the ink is written on a surface without a thick glass layer or a stylus with a plastic tip, the desired writing appears immediately with no delay or lag time. Without using a thick glass layer, a user receives the tactual feedback that they are accustomed to when writing using pen and ink on a suitable writing surface, such as paper. Thus, the writing process is both fast and natural. The interactive writing surface allows a user to write and digitally capture the writing or drawing simultaneously. Because of the immediate transformation to digital, a viewer of the screen will not notice any writing delay. Thus, exists no need to purchase costly computing hardware and software to minimize the lag time to digitize writing.

The invention has been described herein using specific embodiments for illustration only. However, it will be readily apparent to one of ordinary skill in the art that the principles of the invention may be embodied in other ways. Therefore, the invention should not be regarded as limited in scope to the specific embodiments and claims.

The invention claimed is:

1. An interactive writing device comprising:
   a writing surface;
   a touch-sensitive layer or touch-sensitive frame; and
   a heating layer, wherein the heating layer heats the writing surface.

2. The interactive writing device of claim 1, further comprising a writing stylus.

3. The interactive writing device of claim 2, wherein the writing stylus comprises thermal ink.

4. The interactive writing device of claim 1, further comprising a computer device.

5. The interactive writing device of claim 1, further comprising a projector.

6. The interactive writing device of claim 1, wherein the touch-sensitive layer comprises a resistive touch sensor system.

7. The interactive writing device of claim 1, wherein the touch-sensitive layer comprises a projected capacitive sensor system.

8. The interactive writing device of claim 1, wherein the heating layer comprises a matrix of heating pads.

9. The interactive writing device of claim 1, wherein the touch-sensitive frame comprises an infrared touch-sensitive frame.

10. The interactive writing device of claim 1, further comprising a flat panel display screen.

11. A writing system comprising:
    a writing surface, wherein the writing surface is configured to receive handwriting;
    a touch-sensitive layer or touch-sensitive frame, wherein the touch-sensitive layer or touch-sensitive frame captures the handwriting;
    thermal ink deposited on the writing surface via the handwriting; and
    a heating layer, wherein the heating layer heats the writing surface, causing the thermal ink to disappear visibly.

12. The writing system of claim 11, further comprising a computer device.

13. The writing system of claim 11, wherein the captured handwriting is stored digitally.

14. The writing system of claim 13, wherein the captured handwriting is manipulated.

15. The writing system of claim 11, further comprising a writing stylus.

16. The writing system of claim 15, wherein the writing stylus comprises the thermal ink.

17. A method for digitizing ink-based writing, the method comprising the steps of:
    depositing handwriting on a writing surface;
    digitizing the handwriting;
    heating the deposited handwriting; and
    visually disappearing the deposited handwriting.

18. The method of claim 17, further comprising the step of storing the digitized handwriting.

19. The method of claim 18, further comprising the step of transmitting the stored digitized handwriting.

20. The method of claim 17, further comprising the step of depositing additional handwriting over the visually disappeared handwriting.

* * * * *